June 9, 1959 J. J. PARKER ET AL 2,890,056
BALL ACTUATED EXPANSIBLE ARBOR
Filed June 27, 1957

INVENTORS
JOHN J. PARKER & LONDON T. MORAWSKI
BY
ATTORNEYS.

2,890,056
BALL ACTUATED EXPANSIBLE ARBOR

John J. Parker and London T. Morawski, Detroit, Mich.

Application June 27, 1957, Serial No. 668,470

7 Claims. (Cl. 279—4)

This invention relates to expansible arbors and analogous work piece holders. The invention is more particularly concerned with an expansible arbor in which a sleeve or other thin-walled member capable of circumferential and radial expansion is subjected to expanding forces transmitted through a body of small metal balls in a confined space.

Arbors of this class have been proposed heretofore wherein the expansion of the sleeve is brought about by forcing a wedge or cone into a confined body of steel balls or similar "granular" material having properties similar to a body of incompressible fluid. One of the problems with such devices is the difficulty of ensuring equal radial expansion of the work engaging sleeve at all points around the circumference. Unless this is done, a work piece held on the arbor will not be properly centered.

It is an object of the present invention to provide an expansible arbor of the class described wherein a body of small metal balls may be subjected to pressing forces in a manner producing substantially equal radial expansion of the sleeve around the circumference thereof.

Another object is to provide in such an arbor a body of balls of extremely small size and arranged in a number of separate pockets which may be subjected equally to expansion forces.

Another object of the present invention is to provide an arbor of this class in which the individual pockets may be readily filled completely.

Further objects and advantages of the present invention will be apparent from the following description, reference being had to the accompanying drawing wherein a preferred form of the present invention is illustrated.

Figure 1:
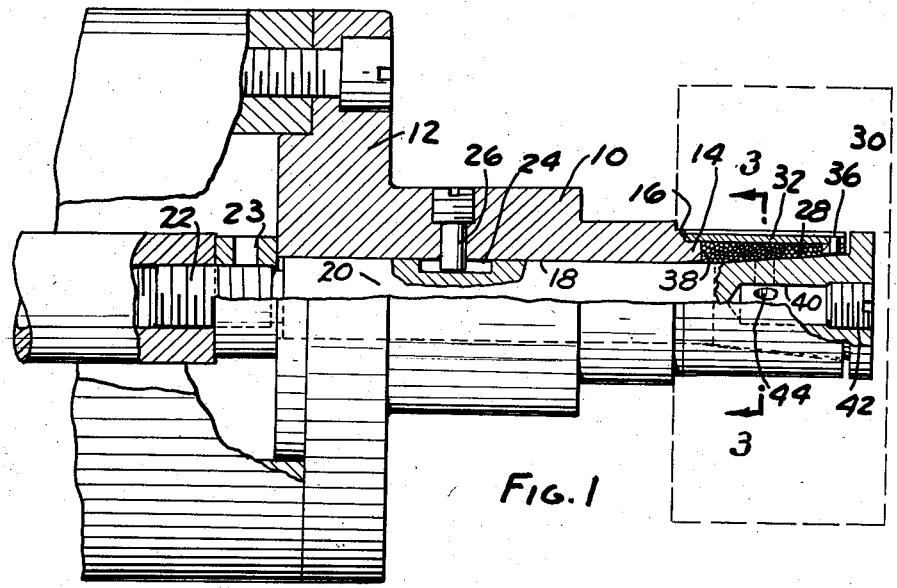
Fig. 1 is a longitudinal sectional view of an expansible arbor incorporating a preferred form of the present invention.

In the device illustrated in the drawings, there is provided a main body member 10 having a flange 12 which may be secured to a machine tool spindle or other support. The body 10 is provided with a section 14 of reduced diameter lying to the right of a shoulder 16. A central bore 18 receives a longitudinally slideable shaft 20 having a thread 22 and a collar 23 at its left hand end. A suitable collet actuating draw bar (not shown) may be coupled to the thread 22 for the purpose of drawing the shaft 20 inwardly. The shaft 20 has a keyway 24 for coaction with the pin 26 mounted in the body 10.

The right hand end of the bore 18 is enlarged conically as shown in Fig. 1 and the right hand end of shaft 20 has a mating conical portion 28 and an outer flange 30. The body section 14 carries an expansible sleeve 32 upon which a work piece may be mounted. A pin 36 is pressed in the body and positions the sleeve 32 against displacement.

Figure 2:
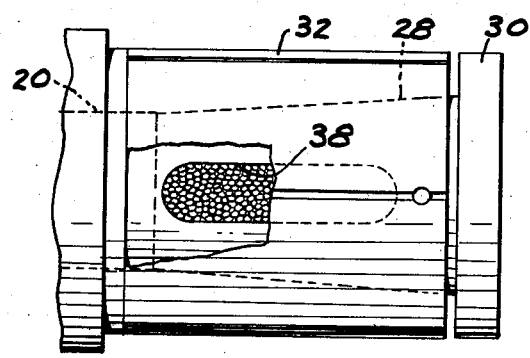
Fig. 2 is a fragmentary top view of the arbor shown in Fig. 1 with a portion of the mechanism broken away.
Figure 3:
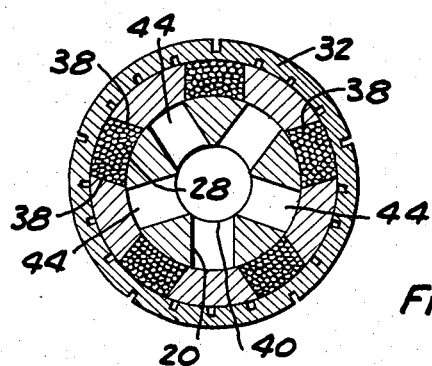
Fig. 3 is a cross section on line 3—3 of Fig. 1.

The reduced diameter body portion 14 has a number of ball receiving pockets 38 of any suitable shape formed therein as perforations extending from the outer surface to the inner surface of the bore 18. The pockets shown are five in number and formed in elongated shape as shown in Fig. 2. It will be understood that a different number of pockets of any desired shape may be utilized, so long as they are distributed in a balanced manner around the circumference of the body and are not wider circumferentially than the space between adjacent pockets. The shaft 20 is provided with a central filling bore 40 which is closed by a plug 42. A number of branch passages 44 equal to the number of pockets are formed radially in the shaft as shown in Figs. 1 and 3.

In the use of the arbor, the shaft 20 is first inserted in the bore 18 of the body 10 and the collar 23 is secured to the thread 22 in a position to leave a small endwise clearance between flange 30 and the end of body portion 14 as shown at 46 in Fig. 1. Before the pin 26 is inserted, the shaft is rotated to a position such that the passageways 44 are lined up to communicate with the pockets 38. With the plug 42 and the body axis vertically removed, the bore 40 may be filled with balls which, through the action of gravity will flow into the pockets 38 and partially fill the same. With the bore 40 maintained substantially full, by the addition of more balls if necessary, a compressed air source may be connected up to the bore 40 to apply a blast for forcing the balls outwardly to substantially fill all of the pockets 38. The air blast serves to blow the balls which are in the bore 40 into the remaining space in the pockets 38, thus filling them completely and leaving some in the radial passageways 44. While the blast is applied, the shaft 20 may be rotated into the position shown in Fig. 3. This action is analogous to that of a rotary valve and traps a quantity of balls in each of the pockets 38 which is sufficient to substantially fill a pocket. The compressed air connection is then removed, the surplus balls poured out of the bore 40 and the plug 42 replaced. After putting the pin 26 into place to engage keyway 24, the arbor is then ready for use.

It will be seen that when a work piece is placed on the expansible sleeve 32, the latter may be expanded by wedge action when the shaft 20 is drawn to the left by the collet draw bar. This causes the cone 28 to pack the balls in each pocket more tightly and produce an expanding force acting in a radial direction upon that portion of the inner surface of the sleeve 32 which lies immediately over each pocket 38. Thus, there results a uniform, radial expansion of the sleeve 32 which is equally distributed around the circumference of the sleeve due to the equal spacing between adjacent pockets.

The charge of balls in each pocket is preferably very large in number and small in diameter. It has been found that hardened steel balls having a diameter under .035 are sufficiently small that they substantially equalize the expansive force over the entire area of a pocket 38 as well as equalizing the expansion of all the various pockets. Likewise, by using balls of such a size (a diameter of the order of .030 is preferred), that they will be picked up in suspension in an air blast of reasonable velocity, the equalization of expansion forces around the full periphery of the sleeve is improved by insuring a tight filling of the pockets initially. Steel balls of the type used for ball point fountain pens are found to be admirably suited to this purpose. The balls must be large enough, however, so that they do not enter into the clearance space between the cone 28 and the bore 18 when the arbor is contracted and the cone 28 is in its right hand position. The expansible sleeve 32 is preferably formed of hardened steel and provided with a number of axial slots 48 which allow for radial and circumferential expansion.

It will thus be seen that the present invention provides an expansible arbor in which expanding forces are applied with equal circumferential distribution around the interior of a thin wall sleeve. It will further be seen that the expansion and contraction are controlled by a conical wedge which acts upon a plurality of bodies of small hardened balls within a confined space to produce an accurately controlled expansion around the circumference of the sleeve.

While the form of embodiment of the invention as herein disclosed constitutes a preferred form, it is to be understood that other forms might be adopted, all coming within the scope of the claims which follow.

What is claimed is as follows:

1. An expansible arbor for holding a work piece comprising a work engaging sleeve the wall of which is radially expansible throughout its axial extent, a body member separate from said sleeve and having a portion fitting the interior of the sleeve, means forming a conical bore in the body portion, a plurality of individual perforations in the body portion extending between the interior of the sleeve and the bore, the perforations being of elongated form axially and distributed with equal spacing circumferentially of the body portion, a conical plug shiftable in the bore, a charge of small spheres filling the perforations between the plug and the sleeve, and means forming filling passages in the plug which are selectively shiftable into and out of communication with each of the perforations.

2. An expansible arbor for holding a work piece comprising a work engaging sleeve the wall of which is radially expansible, a body member having a portion fitting the interior of the sleeve, means forming a conical bore in the body portion, a plurality of perforations in the body portion extending between the interior of the sleeve and the bore, the perforations being of elongated form axially and distributed with equal spacing circumferentially of the body portion, a conical plug shiftable in the bore, a charge of small spheres filling the perforations between the plug and the sleeve, and means forming filling passages in the plug which are selectively shiftable into and out of communication with the perforations, the filling passages being radial and having a common central inlet passage.

3. An expansible arbor for holding a work piece comprising a work engaging sleeve the wall of which is radially expansible throughout its axial extent, a body member separate from said sleeve and having a portion fitting the interior of the sleeve, means forming a conical bore in the body portion, a plurality of circumferentially spaced perforations in the body portion extending between the interior of the sleeve and the bore, a conical plug shiftable in the bore, a charge of small spheres filling the perforations between the plug and the sleeve, and means forming filling passages in the plug which are selectively shiftable into and out of communication with each of the perforations, the filling passages being radial and having a common central inlet passage.

4. An expansible arbor for holding a work piece comprising a work engaging sleeve the wall of which is radially expansible throughout its axial extent, a body member separate from said sleeve and having a portion fitting the interior of the sleeve, means forming a conical bore in the body portion, a plurality of circumferentially spaced perforations in the body portion extending between the interior of the sleeve and the bore, a pourable incompressible fluid material in said perforations and a single member in the bore shiftable circumferentially to establish or cut off a connection to the perforations and shiftable axially to apply an expansive force to the sleeve through the material.

5. An expansible arbor for holding a work piece comprising a work engaging sleeve which is radially expansible throughout its axial extent, a body member separate from said sleeve and having a portion fitting the interior of the sleeve, means forming a conical bore in the body portion, a plurality of individual sockets spaced circumferentially around the body portion and extending radially from the inner surface of the sleeve to said bore, the portions of the inner surface of said sleeve overlying the radially outer ends of said sockets being smooth and continuous, said sleeve having axially extending weakening means formed on other surface portions thereof which permit radial expansion of the sleeve, a conical plug shiftable in said bore, a charge of small metal balls filling said sockets between said plug and said sleeve and means forming radially extending filling passageways in said plug adapted to communicate with each of said sockets.

6. The combination called for in claim 5 wherein said plug has a central bore, said radially extending filling passageways communicating with said last mentioned bore, said plug being rotatable relative to said body to shift said filling passageways into and out of registration with said sockets.

7. The combination called for in claim 5 wherein the inner diameter of said sleeve in the unexpanded condition corresponds generally to the outer diameter of said body portion.

References Cited in the file of this patent

UNITED STATES PATENTS

| | | |
|---|---|---|
| 1,548,730 | Mirfield | Aug. 4, 1925 |
| 2,715,532 | Gunther | Aug. 16, 1955 |
| 2,759,733 | Sloan | Aug. 21, 1956 |